United States Patent [19]

Mori

[11] 4,150,983

[45] Apr. 24, 1979

[54] TIN BASE WHITE METAL BEARING ALLOYS

[75] Inventor: Sanae Mori, Nagoya, Japan

[73] Assignee: Daido Metal Company Ltd., Nagoya, Japan

[21] Appl. No.: 832,696

[22] Filed: Sep. 12, 1977

[30] Foreign Application Priority Data

Apr. 22, 1977 [JP] Japan .................................. 52-47137

[51] Int. Cl.² ............................................. C22C 13/00
[52] U.S. Cl. .................................................. 75/175 A
[58] Field of Search .......................... 75/175 R, 175 A

[56] References Cited

FOREIGN PATENT DOCUMENTS 1021975 3/1966 United Kingdom .................. 75/175 A Primary Examiner—M. J. Andrews
Attorney, Agent, or Firm—Karl W. Flocks

[57] ABSTRACT

Bearing alloys are made by adding chromium, one or more rare earth elements and/or magnesium to the conventional Sn-base white metal bearing alloys. The addition of such additives, even only with slow cooling after casting, enables the refining of cubic crystal grains and acicular crystal grains in the alloy structure, improving the bearing characteristics. The amounts to be added are specified to be within the ranges between 0.005% and 0.5% by weight for Cr, 0.001% and 1% by weight for rare earth element or elements and 0.001% and 1% by weight for Mg.

20 Claims, 17 Drawing Figures x100 x100 x100 x100 x100 x100 x100 x100 x100 x100 x100 x100 x100 x100 x100 x100 x100 x100

×100 ×100

×100 ×100

×100 ×100

×100 ×100

TIN BASE WHITE METAL BEARING ALLOYS

The present invention relates to an improvement of the well-known conventional Sn-base white metal bearing alloys.

The Sn-base white metal bearing alloys heretofore known generally contain 1–10% Cu, 3–15% Sb, and 0% to less than 15% Pb, all of which being percentage by weight percent, with the remainder Sn with the unavoidable impurities.

Among the conventional alloys, those not containing are used for high speed, heavy load bearings. When this type of alloy is used as the bearings for large marine diesel engines or other general industrial machines, it is essential to obtain good performance of the bearings that the the alloy have fine grain structure. Usually a quenching after casting has been considered as the one and only means of accomplishing this end.

There is a problem, however, that with the increase in size and complicated construction of the bearings it becomes extremely difficult to quench them effectively at the time of casting.

With a view of solving the problem, the present invention has been made as the result of numerous researches and experiments conducted by the inventor of this invention. It has been found that the addition of small amounts of other elements to the conventional alloy enables grain refinement without the necessity of quenching and even by slow cooling alone the cubic crystal grains (SbSn) and acicular crystal grains ($Cu_6Sn_5$), which can be seen in the structure of said alloy, can be crystallized into fine grains thus, the invention remarkably improve the alloy in its bearing characteristics.

An object of the invention is to provide a novel Sn-base white metal bearing alloy, wherein the cubic crystal grains and acicular crystal grains in the alloy structure can be made very fine using only a slow cooling after casting, thus improving the characteristics of the alloy as a bearing alloy.

Another object of the invention is to provide a novel Sn-base white metal bearing alloy by adding Cr and rare earth element or elements to the well known conventional Sn-base white metal bearing alloy so that the cubic and acicular crystal grains to be seen in the alloy structure can be refined using only a slow cooling after casting.

A further object of the invention is to provide a novel Sn-base white metal bearing alloy by adding Cr and Mg to the well known conventional Sn-base white metal bearing alloy so as the cubic and acicular crystal grains to be seen in the alloy structure can be made very small in size using only a slow cooling process after casting.

A still further object of the invention is to provide a novel Sn-base white metal bearing alloy by adding Cr, rare earth element or elements, and Mg to the well known conventional alloy so that the cubic and acicular crystal grains to be seen in the alloy can be made to have a fine grained structure just by a slow cooling after casting.

Yet another object of the invention is to provide a Sn-base white metal bearing alloy increased in tensile strength by further adding Cd to the abovementioned novel Sn-base white metal bearing alloys.

A yet further object of the invention is to provide a Sn-base white metal bearing alloy increased in elongation by adding Co to said novel Sn-base white metal bearing alloys, thereby obtain a fine grained microstructure.

The Sn-base white metal bearing alloys in accordance with the present invention can be summarized as follows:

(1) A Sn-base white metal bearing alloy containing 0.005–0.5% by weight of Cr, and 0.001–1% by weight of rare earth elements in addition to the composition of the conventional Sn-base white metal bearing alloy.

(2) A Sn-base white metal bearing alloy containing 0.005–5% by weight of Cr and 0.001–1% by weight of Mg in addition to the composition of the conventional Sn-base white metal bearing alloy.

(3) A Sn-base white metal bearing alloy containing 0.005–0.5% by weight of Cr, 0.001–1% by weight of rare earth elements and 0.001–1% by weight of Mg in addition to the composition of the conventional Sn-base white metal bearing alloy.

(4) Sn-base white metal bearing alloys as set forth in items (1) through (3) above, wherein 0.1–2% by weight of Cd is further added.

(5) Sn-base white metal bearing alloys as set forth in items (1) through (3) above, wherein 0.005–0.5% by weight of Co is further added.

(6) Sn-base white metal bearing alloys as set forth in items (1) through (3) above, wherein 0.1–2% by weight of Cd and 0.005–0.5% by weight of Co are further added.

FIG. 1 through FIG. 3 are alloy structures of the conventional alloys.

FIG. 4 through 11 show alloy structures of the alloys in accordance with the present invention.

FIG. 12 and FIG. 13 show the alloy structures of the alloys for comparison purpose.

Figure 1:
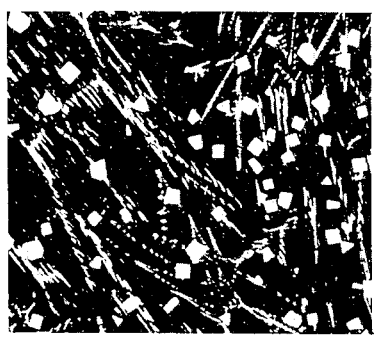
FIG. 1 through FIG. 13 are photomicrographs, magnification ×100, of Sn-base white metal bearing alloys. Those photographs in the left row show the structures as quenched and those in the right row show the structures as slowly cooled.
Figure 1:
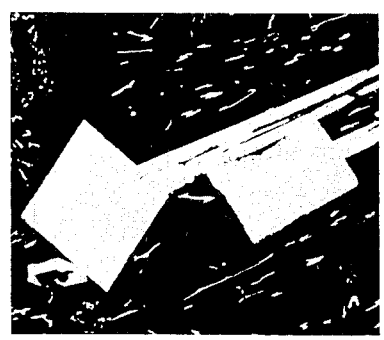

The reason for which the upper and lower limits for the amounts of the elements to be added were determined at the above-mentioned percentages and the meritorious effects of said elements will be enumerated hereinafter. All amounts of the alloying elements, by the way, are indicated as percentages by weight.

(1) Cr: 0.005–0.5%
This refines acicular crystal grains and increases the strength, and particularly also the elongation. With less than 0.005%, the inoculation effect is poor. The addition in excess of 0.5%, however, does not bring about any further effect and an unnecessary addition of Cr rather increases oxidation of the metal and degrades its castability.

(2) Rare earth element or elements: 0.001–1%
These elements combined with Cr refine the cubit crystal grains and increase the strength, and further elongation. With less than 0.001%, any appreciable inoculation effect is not obtained. The effect of addition ceases to increase at 1%. An excess addition increases the oxidation of the molten metal as well as degrades castability. As to the rare earth element or elements to be added, one or more of the elements selected from the group consisting of Ce, La, Y, Nd, Pr and Sm or a mixture thereof, or a misch metal (e.g., an alloy available on the market consisting of approximately 48 to 98% Ce and the remainder substantially the other rare earth elements such as La, Nd, Pr and Sm) can be used. In the embodiments described hereinafter, a mixture of rare earth elements, i.e., a misch metal consisting of 48% Ce, 30% La, 10% Nd, 5% Pr and 7% in total of Pm, Sm and Eu was used. (This shall be referred to just as rare earth elements hereinafter.)

(3) Cd: 0.1–2%

This element increases the strength without impairing the toughness of the alloy. The increase of the strength is slight when it is less than 0.1%. The addition in excess of 2% makes the alloy brittle and also lowers the strength at high temperatures because of the eutectic reaction place with Sn.

(4) C0: 0.005–0.5%

This together with Cr, brings about synergistic effect of refining the acicular crystal grains and increasing the strength, and especially the elongation also. The addition in the amount less than 0.005% yields only a small effect of inoculation and the addition in excess of 0.5% does not improve the effect any more. And an unnecessary excessive addition increases the oxidation of the molten alloy and lowers the castability of the molten metal.

(5) Mg: 0.001–1%

Cooperative with Cr, it has a synergistic effect of refining the acicular crystal grains and increasing the strength, and especially the elongation. With addition of less than 0.001%, the inoculation effect is poor, and the effect of addition ceases at 1%. An unnecessary addition rather accelerates oxidation of the molten alloy and lowers the castability.

(6) Re: The combined action and combined effect of the above-mentioned additives, Cr, rare earth elements and Cd or Cr, Mg and Cd: The combined action of Cr and rare earth element or elements or Cr and Mg refines both the cubic crystal grains and acicular crystal grains and the further addition of Cd has the effect of increasing the strength.

(7) Re: The combined action and combined effect of the above-mentioned additives, Cr, rare earth element or elements and Co or Cr, Mg and Co: The combined action of Cr, rare earth element or elements or Cr, Mg and Co has the effect of making both the cubic crystal grains and acicular crystal grains extremely small.

(8) Re: The combined action and combined effect of the above-mentioned additives, Cr, rare earth element or elements, Co and Cd or Cr, Mg, Co and Cd: By the combined action of Cr, rare earth element or elements and Co or Cr, Mg and Co, the cubic crystal grains and acicular crystal grains are made extremely small and by the further addition of Cd, a higher strength can be obtained.

(9) Re: The combined action and combined effect of the additives, Mg, rare earth element or elements or Mg and rare earth elements: The addition of Mg or rare earth element or elements to the conventional Sn-base white metal bearing alloys does not render the cubic and acicular crystal grains smaller. The addition of Mg together with rare earth elements does not have the effect of refining the cubic and acicular crystal grains either.

Now the alloys prepared in accordance with the present invention will be compared with the conventional alloys and other alloys for comparison purpose in Table 1 and Table 2 and FIG. 1 through FIG. 17. The casting method and testing conditions were same for all alloys and they are shown in Table 3.

Table 1

| Type of alloys | Dwg. No. | Chemical Compositon (% by weight) | | | | | | | |
|---|---|---|---|---|---|---|---|---|---|
| | | Cu | Sb | Cd | Cr | Co | Rare earth elements | Mg | Sn |
| Conventional alloys | FIG. 1 | 3.5 | 9.3 | — | — | — | — | — | Remainder |
| | FIG. 2 | 3.4 | 9.2 | 0.6 | — | — | — | — | " |
| | FIG. 3 | 3.3 | 9.5 | 0.7 | 0.09 | — | — | — | " |
| | FIG. 4 | 3.5 | 9.5 | — | 0.09 | — | 0.10 | — | " |
| | FIG. 5 | 3.4 | 9.4 | 0.7 | 0.10 | — | 0.10 | — | " |
| | FIG. 6 | 3.5 | 8.7 | — | 0.10 | 0.11 | 0.10 | — | " |
| Alloys of this invention | FIG. 7 | 3.4 | 9.9 | 0.7 | 0.09 | 0.12 | 0.10 | — | " |
| | FIG. 8 | 3.5 | 9.5 | — | 0.10 | — | — | 0.05 | " |
| | FIG. 9 | 3.4 | 9.4 | 0.7 | 0.09 | — | — | 0.05 | " |
| | FIG. 10 | 3.3 | 9.2 | — | 0.08 | 0.12 | — | 0.05 | " |
| | FIG. 11 | 3.4 | 9.1 | 0.7 | 0.09 | 0.12 | — | 0.05 | " |
| Alloys for comparison | FIG. 12 | 3.2 | 8.4 | 0.7 | — | — | 0.10 | — | " |
| | FIG. 13 | 3.2 | 8.5 | 0.6 | — | — | — | 0.05 | " |

Note:
In Table 1, the percentages shown for rare earth elements and Mg are the amounts of the elements that were actually added and the values for the other elements are those obtained by chemical analysis of the alloy specimen.

Table 2

| Type of alloys | Dwg. No. | Mechanical properties | | | | | |
|---|---|---|---|---|---|---|---|
| | | As quenched | | | As slow cooled | | |
| | | Tensile strength (kg/cm$^2$) | Elongation (%) | Hardness (Hr) | Tensile strength (kg/mm$^2$) | Elongation (%) | Hardness (Hv) |
| Conven- | FIG. 1 | 9.6 | 8.5 | 27 | 6.2 | 3 | 22.5 |

Table 2-continued

| Type of alloys | Dwg. No. | Mechanical properties | | | | | |
|---|---|---|---|---|---|---|---|
| | | As quenched | | | As slow cooled | | |
| | | Tensile strength (kg/cm²) | Elongation (%) | Hardness (Hr) | Tensile strength (kg/mm²) | Elongation (%) | Hardness (Hv) |
| tional alloys | FIG. 2 | 10.0 | 8 | 29.5 | 6.7 | 3.5 | 25.5 |
| | FIG. 3 | 10.0 | 15.5 | 29 | 7.9 | 6 | 26.5 |
| | FIG. 4 | 9.0 | 20 | 25 | 8.1 | 8 | 25 |
| | FIG. 5 | 10.0 | 17 | 30 | 8.2 | 7 | 27.5 |
| | FIG. 6 | 9.1 | 17 | 26 | 8.2 | 8.5 | 25 |
| Alloys of this invention | FIG. 7 | 10.5 | 21.5 | 29 | 9.5 | 9 | 27.5 |
| | FIG. 8 | 9.0 | 19 | 25 | 8.0 | 10 | 25 |
| | FIG. 9 | 10.2 | 20.5 | 29 | 8.1 | 9.5 | 26.5 |
| | FIG. 10 | 9.2 | 19.5 | 25 | 7.9 | 11.8 | 24 |
| | FIG. 11 | 10.7 | 20.5 | 29 | 9.7 | 8 | 28.5 |
| Alloys for comparison | FIG. 12 | 10.4 | 11 | 30 | 6.6 | 3 | 27 |
| | FIG. 13 | 10.2 | 12.5 | 28 | 7.8 | 5 | 26.5 |

Table 3

| | Cooling Method | Casting Temp. | Mold Temp. | Solidification Time |
|---|---|---|---|---|
| Casting conditions | Quenching | 450° C. | Room Temp. | 10 seconds |
| | Slow Cooling | 500° C. | 300° C. | 15 minutes |

FIG. 1 through FIG. 13 are the microphotographs of 100 magnifications, showing the structures of test specimens obtained from the sample pieces of the conventional alloys, the alloys of this invention, and the alloys for comparison, having the compositions as shown in Table 1, prepared by casting under the conditions as shown in Table 3. Table 2 shows the mechanical properties of the alloys having chemical compositions as shown in Table 1.

Figure 2:
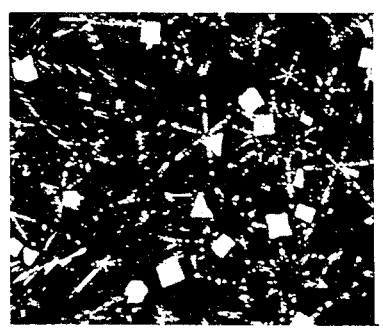
Figure 2:
Figure 3:
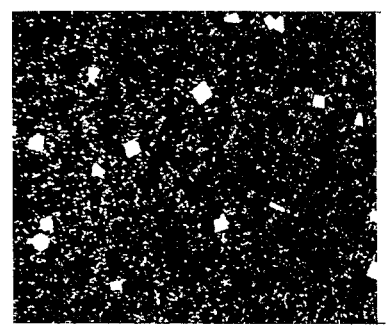
Figure 3:

FIG. 1 through FIG. 3 show the structures as quenched (the photographs on the left side) and those as slowly cooled (the photographs on the right side) of the conventional alloys. The alloy structures in FIG. 1 consist mainly of Sn and contain Cu and Sb. In FIG. 2 are shown strengthened alloy structures wherein Cd is further included in the alloy of FIG. 1.

FIG. 3 shows strengthened alloy structures of the alloy of FIG. 2 inoculated with Cr.

Figure 4:
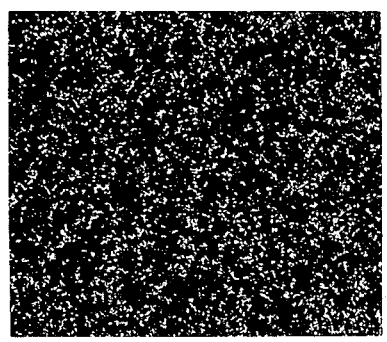
Figure 4:
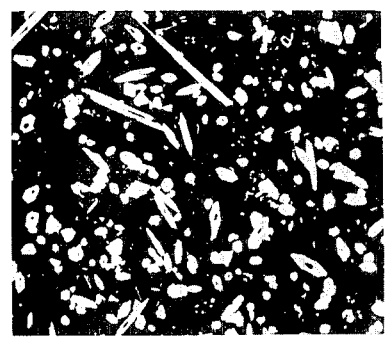

FIG. 4 through FIG. 11 show the alloys of the present invention, the left hand photographs showing the structures when quenched and the right hand photographs showing the structures obtained when slowly cooled. In FIG. 4 are shown alloy structures wherein cubic and acicular crystal grains are refined. This alloy was made by adding Cr and rare earth elements to the alloy of FIG. 1.

As apparent from these photographs, the acicular crystal grains and cubic crystal grains, particularly the latter, are very much refined when compared with those seen in the conventional alloys.

Figure 5:
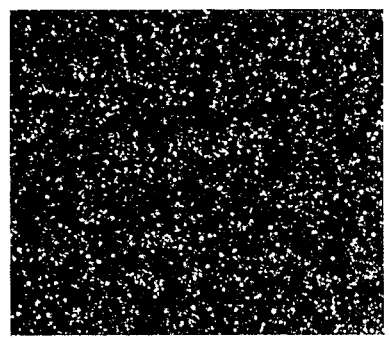
Figure 5:
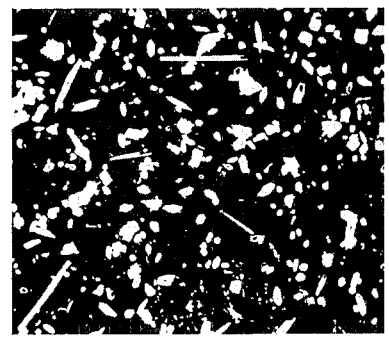

In FIG. 5 are strengthened alloy structures of the alloy made by adding Cr and rare earth elements which render the cubic as well as acicular crystal grains very fine, and further Cd, which increased the strength, to the alloy of FIG. 1.

Figure 6:
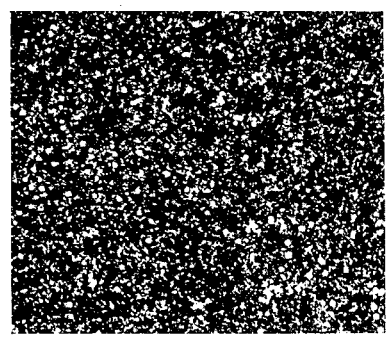
Figure 6:
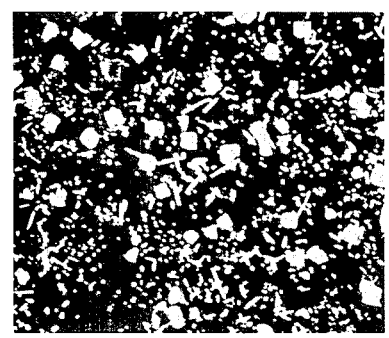

FIG. 6 shows the structures of an alloy wherein the cubic and acicular crystal grains are refined by adding Cr, Co and rare earth element or elements to the alloy of FIG. 1. It can be noted from the photographs that the acicular crystal grains are made very small by the combined effect of Cr and Co.

Figure 7:
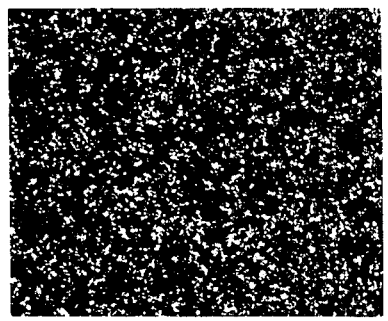
Figure 7:
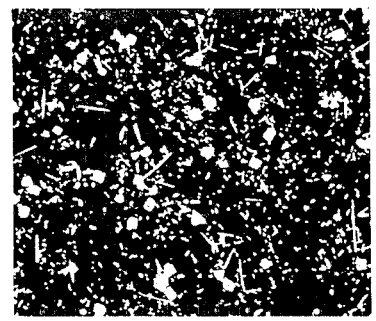

FIG. 7 shows alloy structures wherein the cubic and acicular crystal grains are refined by the addition of Cr, Co and rare earth element or elements to the alloy of FIG. 1, and which is also increased in strength by further addition of Cd.

Figure 8:
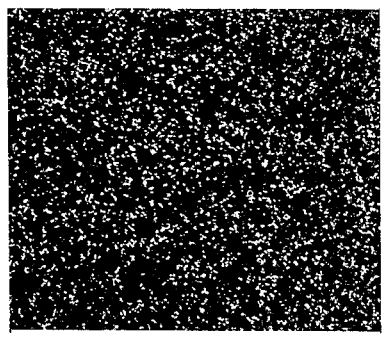
Figure 8:
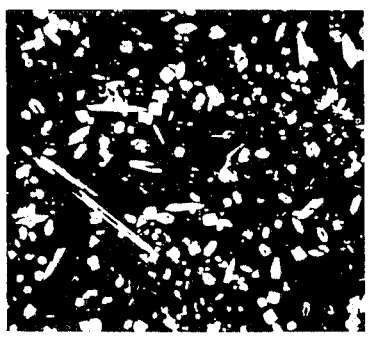

FIG. 8 shows the microstructures of an alloy produced by adding Cr and Mg to the alloy of FIG. 1. As clearly seen in the photographs, acicular crystal grains and cubic crystal grains are made much smaller in comparison with those in the conventional alloys. This refining effect is especially remarkable for the cubic crystal grains.

Figure 9:
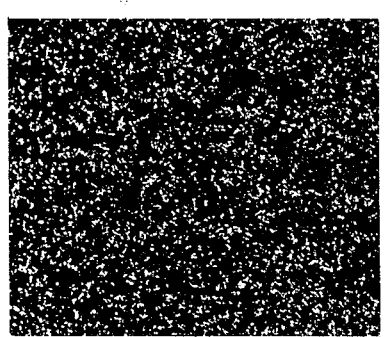
Figure 9:
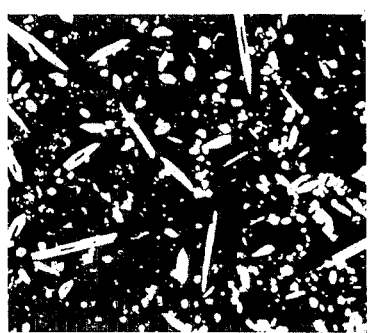

FIG. 9 shows the structures of an alloy produced by adding Cr and Mg, which refine the cubic and acicular crystal grains, and further Cd, which increased the strength, to the alloy of FIG. 1.

Figure 10:
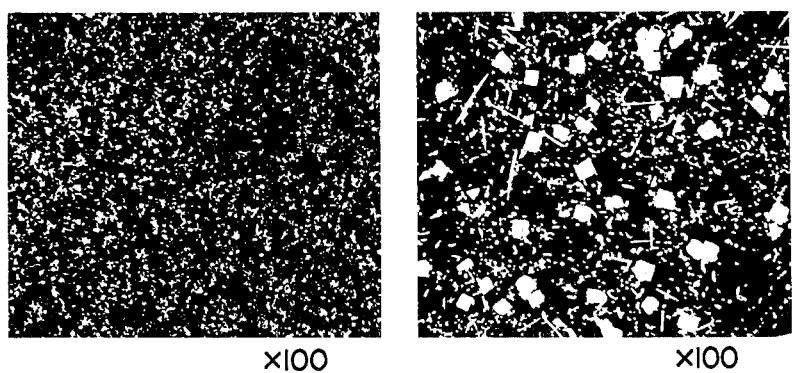

FIG. 10 shows the structures of an alloy produced by adding Cr, Co and Mg to the alloy of FIG. 1 so as to refine the cubic and acicular crystal grains therein. It can be noted from the photographs that the cubic and acicular crystal grains were made very small by the combined effect of Cr and Co.

Figure 11:
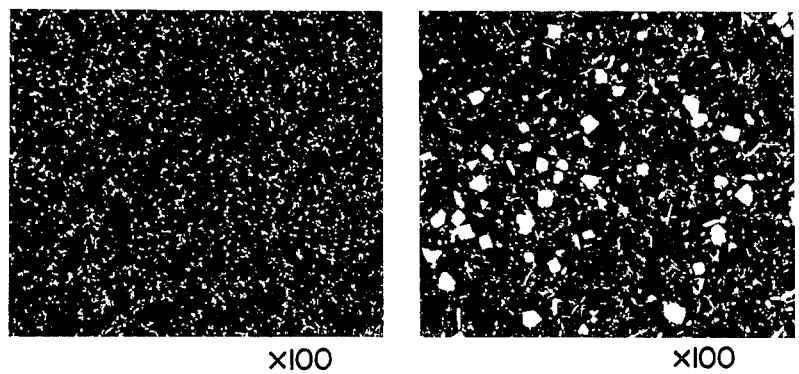

In FIG. 11 are microstructures of an alloy made by adding to the alloy of FIG. 1 Cr, Co and Mg, which make smaller the cubic and acicular crystal grains therein, and Cd, which strengthened the alloy.

Figure 12:
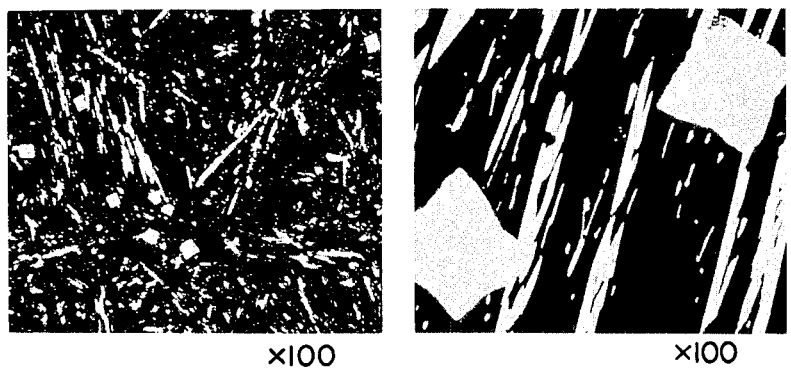
Figure 13:
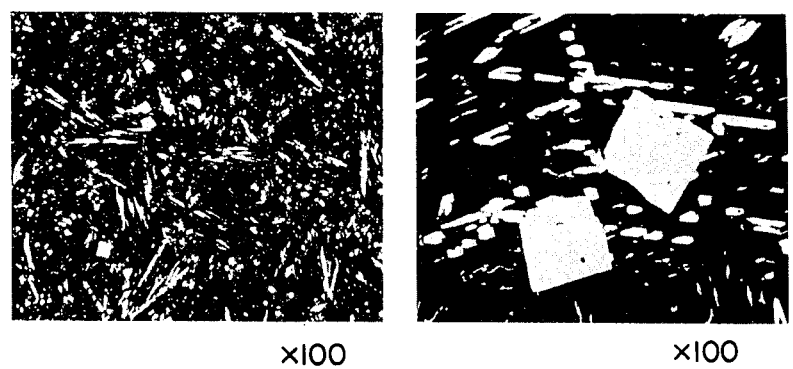
Figure 14:
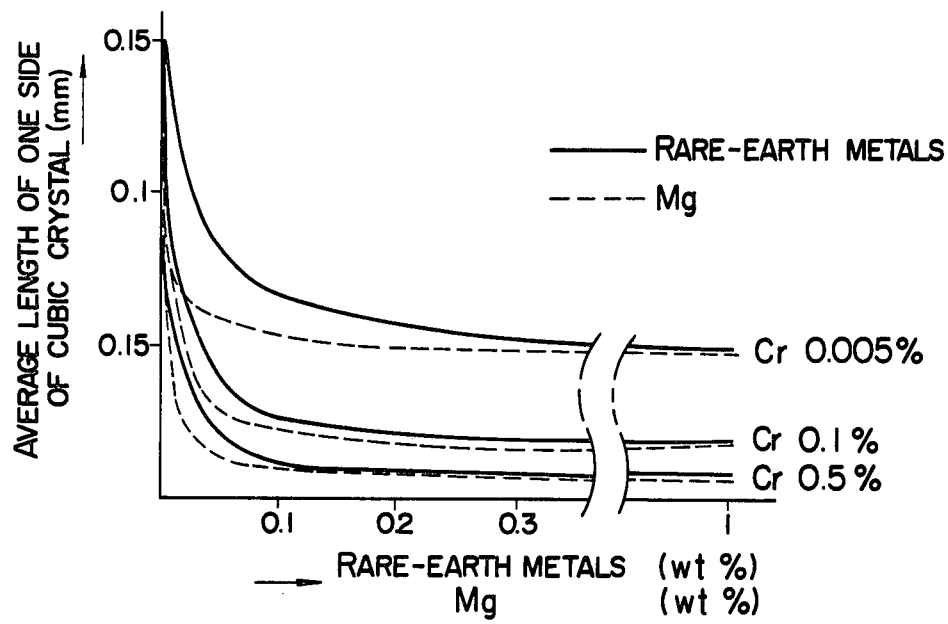
FIG. 14 through FIG. 16 are the graphs showing the effects of the additives on the cubic and acicular crystal grains in the alloys of this invention.

FIG. 12 and FIG. 13 show the structures of the alloys for comparison purpose. The photographs on the left side show those of the alloys as quenched and the photographs on the rightside are those of the alloys as slowly cooled. FIG. 12 shows the structure of an alloy produced by adding rare earth element or elements, and FIG. 13 shows the structure of an alloy produced by adding Mg to the alloy of FIG. 2. As obvious from the photographs, the structures shown therein are not at all refined as compared with those of the conventional alloys. This indicates that the addition of Mg or rare earth element or elements alone is not effective in refining crystal grains.

The inventors have found as the result of numerous tests of trial and error that the addition in combination of Cr and rare earth element or elements, or Cr and Mg or Cr, Mg and rare earth element or elements to the conventional Sn-base white metal bearing alloys consisting of Cu, Sb and Sn has a combined effect of refining the acicular crystal grains and more remarkably the cubic crystal grains, that the further addition of Co has an effect of further refining the cubic and acicular crystal grains by the combined effect and that still further addition of Cd has an effect of increasing the strength of the alloys.

Table 2 shows the results of tests carried out for comparing the mechanical properties (as quenched and as slowly cooled) of the conventional alloys, the alloys of this invention and the alloys for reference purpose.

This table indicates that the alloys of this invention, particularly the alloys as slowly cooled are superior to the conventional alloys in strength because of the grain refining effect.

FIG. 14 through FIG. 17 show the relationships between the amounts of addition (or the compounded value) of the additional elements and their effects in the alloys of this invention. The effect that Cr and rare earth element or elements or Cr and Mg had on the refining of the cubic crystal grains when the alloys were slowly cooled (under the same casting conditions as shown in Table 3) is shown in Table 14, in which the vertical axis gives the mean length of one side of the acicular crystal grains, and the horizontal axis gives the amount of Mg or rare earth element or elements. While the amounts of Cu and Sb were kept at 3.5% and 9% respectively, the amount of Cr was varied to three different values, 0.005%, 0.1% and 0.5%, all of which being percentages by weight.

The graph indicates that the combined effect of adding Cr and rare earth element or elements or Cr and Mg has the effect of refining the cubic crystal grains. The combination of Cr with rare earth element or elements or with Mg shows the grain refining effect, when Cr amount is 0.005% or more but such effect will not very when Cr amount exceeds 0.5%. Also clear from the graph is the point that both rare earth element or elements and Mg are not effective in refining cubic crystal grains when these amounts are less than 0.001% and that neither increase the effect any more when the amounts of these exceed 1%.

Figure 15:
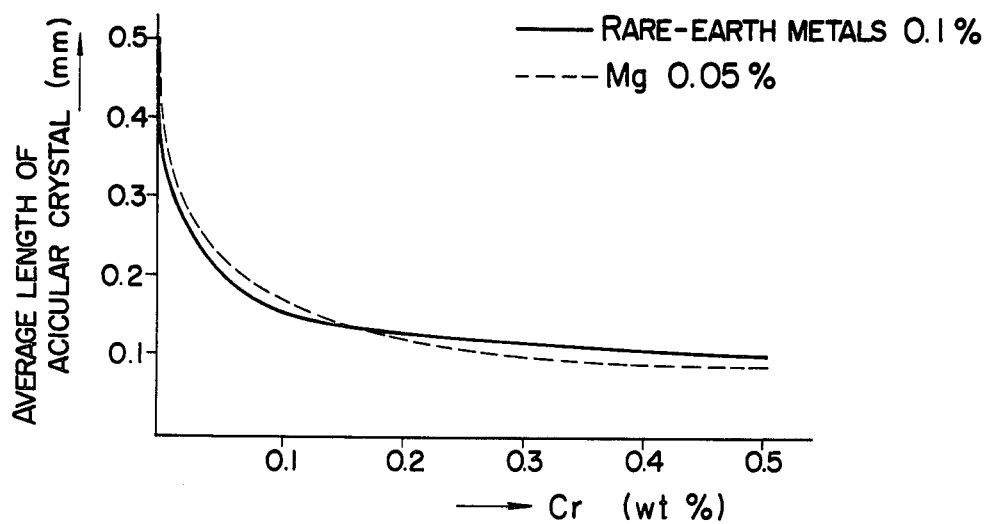

FIG. 15 shows the effect of Cr on the grain refining of acicular crystal grains in the alloys as slowly cooled (as per casting conditions in Table 3). The horizontal axis gives the percentage of Cr which is varied while the percentages of Cu being 3.5%, Sb being 9%, rare earth element or elements 0.1% and Mg 0.05%, and the vertical axis gives the mean length of acicular crystal grains.

The graph indicates that Cr is effective in refining acicular crystal grains when the percentage of Cr is 0.005% or more but such effect ceases increasing when the percentage of Cr exceeds 0.5%.

Figure 16:
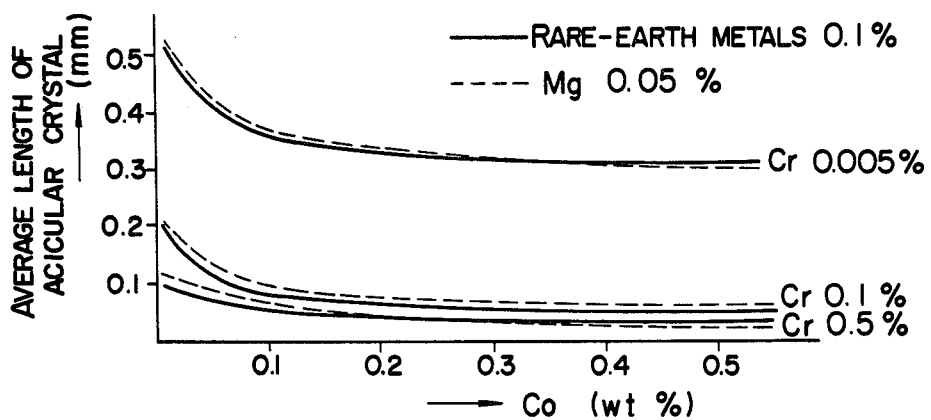

The effect of Cr and Co on the sizes of the acicular crystal grains in the alloys as slowly cooled (as per casting conditions shown in Table 3) is shown in FIG. 16, in which the percentage of Cu is 3.5%, that of Sb is 9%, that of rare earth element or elements 0.1% and Mg 0.05%, while the percentage of Cr is changed to three different values of 0.005%, 0.1% and 0.5% and the percentage of Co is plotted along the horizontal axis, all of which being percentages by weight, and the mean length of the acicular crystal grains are plotted along the vertical axis. It can be noted from the graph that the combined effect of Cr and Co makes the acicular crystal grains very small in length and that such effect begins to be observed when Cr and Co exceed 0.005% and stops to increase further when they exceed 0.5%.

Figure 17:
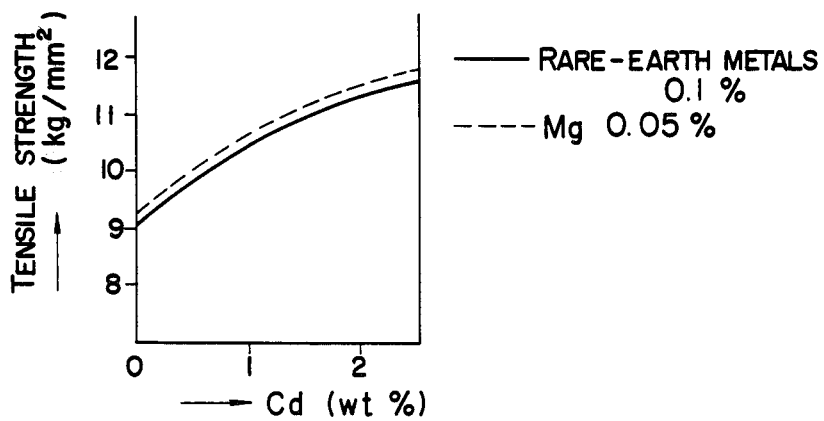
FIG. 17 is a graph which shows the effect of addition of Cd on the tensile strength of the alloys in accordance with this invention.

FIG. 17 shows the effect of the amount of Cd on the tensile strength. The percentage by weight of Cd, which was changed, is plotted along the horizontal axis and the tensile strength is plotted along the vertical axis. The amounts of other elements, which were 3.5% Cu, 9% Sb, 0.1% Cr and 0.1% rare earth element or elements and 0.5% Mg, all of which being percentages by weight, were all kept constant.

The test pieces used for the tensile strength test were machined from the samples pieces as quenched. This graph indicates that the addition of Cd to the alloy, wherein the structure is refined by adding Cr and rare earth element or elements to the conventional alloy, is effective in increasing the tensile strength.

The cadmium starts showing such effect when its amount exceeds 0.1%. When the Cd amount exceeds 2%, however, the elongation decreases and the strength at high temperatures deteriorates because of its eutectic reaction with Sn.

According to various embodiments of the alloys of this invention, one or more of rare earth elements can be effectively used with Cr for making the cubic and acicular crystal grains smaller in size but it is most advantageous to use a misch metal, which is a mixture of said rare earth elements, for economical as well as practical reasons, such as the cost of the materials and the ease in handling.

As explained above, the alloys in accordance with the present invention, wherein the cubic and acicular crystal grains are made smaller in size than those in the conventional Sn-base white metal bearing alloy, are the alloys highly improved in bearing characteristics and therefore suitable for use as the bearings in large size marine diesel engines and other general industrial machines or apparatuses.

I claim:

1. An improved Sn base white metal bearing alloy consisting essentially by weight of 1–10% Cu, 3–15% Sb, 0–15% Pb, 0.005–0.5% Cr, 0.001–1% rare earth element or elements, 0.005–0.5% Co, and the balance being Sn.

2. A Sn-base white metal bearing alloy as claimed in claim 1, wherein said rare earth elements are a misch metal which is a mixture of rare earth elements.

3. A Sn-base white metal bearing alloy as claimed in claim 1, wherein 0.1–2% by weight of Cd is further added.

4. A Sn-base white metal bearing alloy as claimed in claim 3, wherein said rare earth elements are a misch metal which is a mixture of rare earth elements.

5. An improved Sn base white metal bearing alloy consisting essentially by weight of 1–10% Cu, 3–15% Sb, 0–15% Pb, 0.005–0.5% Cr, 0.001–1% rare earth element or elements, 0.1–2% Cd, and the balance being Sn.

6. A Sn-base white metal bearing alloy as claimed in claim 5, wherein said rare earth elements are a misch metal which is a mixture of rare earth elements.

7. A Sn-base white metal bearing alloy consisting essentially by weight of 1–10% Cu, 3–15% Sb, 0–15% Pb, 0.005–0.5% by weight Cr, 0.001–1% by weight of Mg, 0.1–2% by weight of Cd, and the balance being Sn.

8. A Sn-base white metal bearing alloy as claimed in claim 7, wherein 0.005–0.5% by weight of Co is further added.

9. An improved Sn base white metal bearing alloy consisting essentially by weight of 1–10% Cu, 3–15% Sb, 0–15% Pb, 0.005–0.5% Cr, 0.001–1% rare earth element or elements, 0.001–1% Mg, and the balance being Sn.

10. A Sn-base white metal bearing alloy as claimed in claim 9, wherein said rare earth elements are a misch metal which is a mixture of rare earth elements.

11. A Sn-base white metal bearing alloy as claimed in claim 10, wherein 0.005–0.5% by weight of Co is further added.

12. A Sn-base white metal bearing alloy as claimed in claim 11, wherein said rare earth elements are a misch metal which is a mixture of rare earth elements.

13. A Sn-base white metal bearing alloy as claimed in claim 10, wherein 0.1–2.0% by weight of Cd is further added.

14. A Sn-base white metal bearing alloy as claimed in claim 13, wherein said rare earth elements are a misch metal which is a mixture of rare earth elements.

15. A Sn-base white metal bearing alloy as claimed in claim 13, wherein 0.005–0.5% by weight of Co is further added.

16. A Sn-base white metal bearing alloy as claimed in claim 15, wherein said rare earth elements are a misch metal which is a mixture of rare earth elements.

17. A Sn-base white metal bearing alloy consisting essentially by weight of 1–10% Cu, 3–15% Sb, 0–15% Pb, 0.005–0.5% by weight Cr, 0.001–1% by weight of Mg, 0.005–0.5% by weight of Co, and the balance being Sn.

18. A Sn-base white metal bearing alloy consisting essentially by weight of 1–10% Cu, 3–15% Sb, 0–15% Pb, 0.005–0.5% by weight Cr and 0.001–1% by weight of Mg the balance being Sn.

19. An improved Sn base white metal bearing alloy consisting essentially by weight of 1–10% Cu, 3–15% Sb, 0–15% Pb, 0.005–0.5% Cr and 0.001–1% rare earth element or elements the balance being Sn.

20. A Sn-base white metal bearing alloy as claimed in claim 19, wherein said rare earth elements are a misch metal which is a mixture of rare earth elements.

* * * * *